United States Patent
Wood

[15] 3,706,024
[45] Dec. 12, 1972

[54] TAP CHANGING APPARATUS HAVING A GATE CONTROL TRIPPER

[72] Inventor: Peter Wood, Murrysville, Pa.

[73] Assignee: Westinghouse Electric Corporation, Pittsburgh, Pa.

[22] Filed: March 29, 1971

[21] Appl. No.: 128,662

[52] U.S. Cl. ............................................. 323/43.5 S
[51] Int. Cl. .............................................. G05f 1/20
[58] Field of Search ............... 317/33 VR; 323/43.5 S

[56] References Cited

UNITED STATES PATENTS

| | | | |
|---|---|---|---|
| 3,530,369 | 9/1970 | Thompson | 323/43.5 S |
| 3,515,980 | 6/1970 | Throop | 323/43.5 S |
| 3,466,530 | 9/1969 | Matzl | 323/43.5 S |

*Primary Examiner*—A. D. Pellinen
*Attorney*—A. T. Stratton and F. E. Browder

[57] ABSTRACT

Tap changing apparatus including a transformer having a tapped winding, solid state switching elements connected between the winding and a load, and a control circuit which provides the proper gate drive to the switching elements for changing taps. The control circuit senses the voltage and current characteristics of the system to determine at what instant it will gate the switching elements in making a tap change. A tripper circuit senses the system current and trips the control circuit so that a tap change cannot be made when the system current is too low to have its characteristics detected.

4 Claims, 3 Drawing Figures

PATENTED DEC 12 1972 3,706,024

WITNESSES:
Bernard R. Gregory
John R. Hanway

INVENTOR
Peter Wood

BY
F. E. Browder
ATTORNEY 3,706,024

TAP CHANGING APPARATUS HAVING A GATE CONTROL TRIPPER

BACKGROUND OF THE INVENTION

1. Field of the Invention:

This invention relates, in general, to electrical control apparatus and, more specifically, to regulator apparatus of the solid state tap changing type for alternating potential systems.

2. Description of the Prior Art:

Solid state tap changing apparatus having gate control circuitry is described in detail in the patent application, Ser. No. 49,318, filed June 24, 1970, now U.S. Pat. No. 3,619,765 and assigned to the same assignee as the present application. The gate control circuitry associated therewith senses the system voltage and current characteristics to determine the method of making a tap change. It is necessary to sense these variables in order that the proper switching element is switched at the proper time. Failure to properly synchronize the switching may introduce unnecessary tap-to-tap currents and other potentially destructive effects.

Usually, AC regulator apparatus operates at a substantially constant potential with the current being determined by the load conditions. The reasonably stable potential permits accurate sensing of the system voltage. However, due to the wide range of currents which may be involved, the sensing of the system current presents difficulties. The sensing circuit must be able to respond to the high current levels at which the system may operate. This limits the accuracy of the current sensing circuitry at relatively low current levels. If the current sensing circuit fails to sense the characteristics of the system current because it is too low, the gate control circuitry could produce a switching sequence which may have destructive effects.

If the gate control circuitry is prevented from making tap changes when it is unable to satisfactorily detect the characteristics of the system current, the possibility of a destructive tap change is reduced. Therefore, a device which prevents gate controlled tap changes when the system current is below the critical sensing level is desirable. It is also desirable that such a device have a hystersis characteristic which makes it necessary for the system current to increase a reasonable amount above the critical sensing level before the gate control circuitry reacquires its tap changing control. This prevents "hunting" of the circuitry and provides better control when the system current is near the critical level. The gate control circuitry can provide a tap change within one-half cycle of the system current. Therefore, to be effective, the low current sensing device must have a response time sufficient to deactivate the control circuitry within one-half cycle of the system current.

SUMMARY OF THE INVENTION

This invention provides a means for tripping the gate control circuitry when the system current is below a predetermined value. When tripped, the gate control circuitry cannot produce a tap change. The system current must increase to a higher value before the gate control circuitry reacquires its ability to change taps. The response of the trip circuit of this invention permits its operation within one-half cycle of the system current.

A full wave rectified voltage, which is proportional to the system current, is applied to the tripper circuit. The amplitude of this voltage determines whether the output of the tripper will permit the gate control circuitry to change taps. Solid state elements are used to enhance the reliability and economies of the tripper circuit.

BRIEF DESCRIPTION OF THE DRAWING

Further advantages and uses of this invention will become more apparent when considered in view of the following detailed description and drawing, in which.

DESCRIPTION OF THE PREFERRED EMBODIMENT

Figure 1:
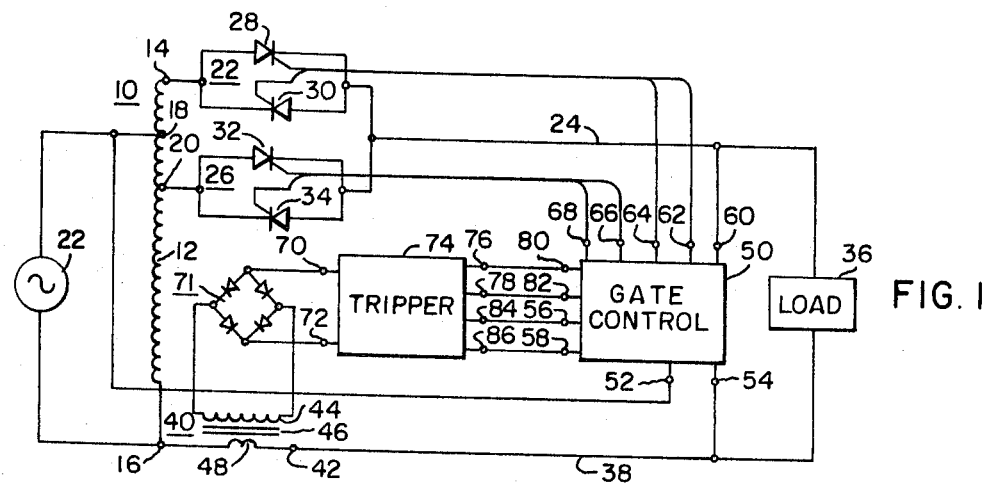
FIG. 1 is a schematic diagram of a tap changer constructed according to this invention.

Referring now to the drawing, and FIG. 1 in particular, there is shown a regulator apparatus constructed according to this invention. A transformer 10, of the autotransformer type, is shown schematically by the winding 12. The winding 12 includes end terminals 14 and 16 and tap terminals 18 and 20. An alternating potential source 22 is connected between the tap terminal 18 and the end terminal 16 to supply AC power to the apparatus. A first bilateral AC switching means 22 is connected between the end terminal 14 and a load connector 24. A second bilateral AC switching means 26 is connected between the tap terminal 20 and the load conductor 24. Each bilateral AC switching means is shown comprising silicon controlled rectifiers connected in inverse parallel although other elements may be used. The switching means 22 comprises SCR's (Silicon Controlled Rectifiers) 28 and 30 and the switching means 26 comprises SCR's 32 and 34, respectively. More than one intermediate tap and switching means may be used with this invention; however, the basic one-tap arrangement of FIG. 1 is shown and discussed for simplicity. Similarly, other transformer winding structures may be used, such as one having physically separate primary and secondary windings.

A load 36 is connected between the load conductor 24 and the load conductor 38. The load 36 may be resistive, regenerative, inductive or capacitive, or a combination thereof. The load conductor 38 is connected to a current transformer 40 at the terminal 42. The transformer 40 comprises a voltage winding 44, a magnetic core 46, and a current winding 48. The current winding 48 is connected between the terminals 42 and 16 and carries the system load current.

A gate control circuit 50 receives voltage signals corresponding to the system voltage at terminals 52 and 54, the system current at terminals 56 and 58, and the load voltage at terminals 60 and 54. The load voltage signal, when compared to a reference signal within the gate control 50, determines whether a tap change is needed. The system voltage and current signals determine which switching elements must be activated and the instant of time the activation should be accomplished. Gate control of the SCR'3 (Silicon Controlled Rectifiers) 28, 30, 32 and 34 is illustrated by the connections to the terminals 62, 64, 66 and 68 of the gate control 50, respectively.

An AC voltage, which is proportional to the system current, is developed in the winding 44 and full wave rectified by the bridge rectification circuit 71. The full wave rectified voltage signal is applied to the terminals 70 and 72 of the tripper 74. The value of the voltage across the terminals 70 and 72 determines the operation of the tripper. The output voltage of the tripper is developed across the terminals 76 and 78. The output signal from the tripper 74 is applied to the gate control 50 at the terminals 80 and 82. It is through this channel that the tripper 74 determines whether the gate control 50 can provide a tap change.

Figure 2:
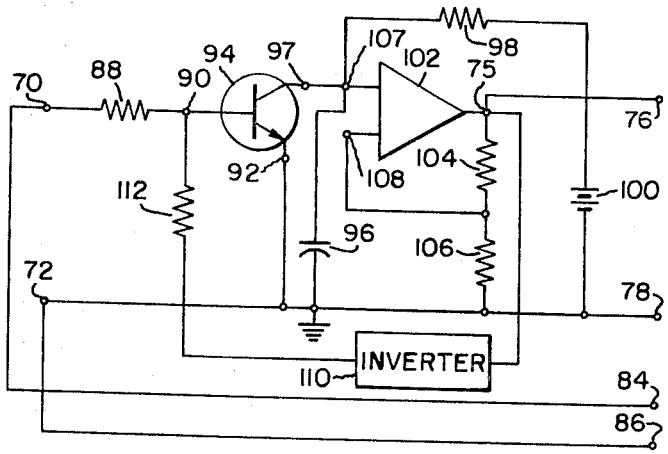
FIG. 2 is a schematic diagram of a tripper circuit constructed according to this invention.

A tripper circuit, which may be used for the tripper 74, is illustrated schematically in FIG. 2. The pulsating input voltage is applied between the terminals 70 and 72. This voltage is supplied to the terminals 84 and 86 for use by the gate control 50. The pulsating voltage which is produced at the terminals 70 and 72 is connected, through the resistor 88, to the base terminal 90 and the grounded emitter terminal 92 of the NPN transistor 94. When the signal voltage attains a predetermined instantaneous value of magnitude, the transistor 94 will be turned on. This will discharge the capacitor 96 which is effectively connected between the collector terminal 97 and ground potential. The capacitor 96 was charged through the resistor 98 from the battery 100 or another DC voltage source. The time constant of the resistor 98-capacitor 96 combination is such that the voltage at the comparator terminal 107 will rise to a sufficient value to activate the comparator 102 within substantially one-half cycle of the system current. Therefore, if the capacitor 96 is not discharged through the transistor 94, it will activate the comparator 102. The comparator 102 is a conventional logic element having an output voltage at the terminal 75 which is determined by comparing the input voltages at the terminals 107 and 108. When the potential at the input terminal 107 is negative with respect to the potential at the terminal 108, the output voltage is positively polarized. When the potential at the terminal 107 is positive with respect to the potential at the terminal 108, the output voltage is negatively polarized. The comparator 102 output voltage is developed between the terminals 76 and 78 which are connected to the gate control circuitry 50 in such a manner as to trip the gate control and prevent tap changing when the output voltage is negatively polarized.

The voltage developed at the output of the comparator 102 is also used to determine the bias point of the transistor 94 and the comparator 102. The feedback provided by the resistors 104 and 106 increases the difference between the input terminal voltages when the comparator 102 output is switched to a negative polarity. The feedback provided by the inverter 110 and the resistor 112 furnishes a bias voltage at the base terminal 90 of the transistor 94. Both feedback voltages alter the input signal voltage requirements necessary to activate the tripper circuit. Once the comparator 102 is activated as a result of a low signal voltage across the terminals 70 and 72, the signal voltage must increase to a fixed higher value before the comparator 102 will be deactivated.

Figure 3:
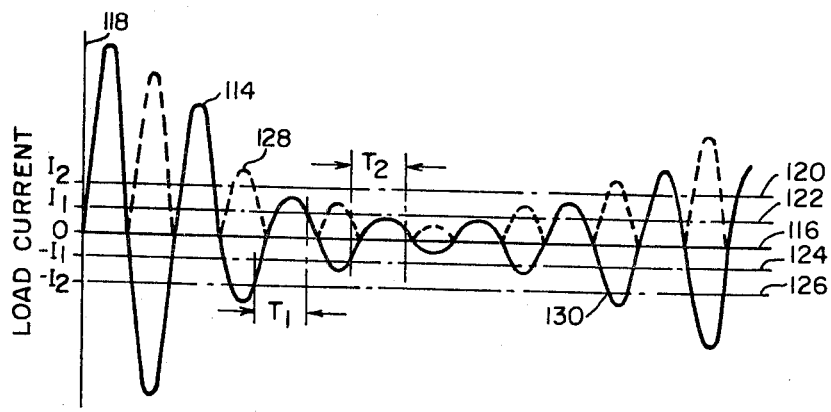
FIG. 3 is a graph illustrating the relation between the system current and the operation of the tripper.

The operation of the tripper 74 is illustrated graphically in FIG. 3. The curve 114 indicates the amplitude of the current which may be flowing in the system. The current curve 114 is plotted relative to the time axis 116 and the amplitude axis 118. Lines of equal amplitude 120, 122, 124 and 126 represent levels of system current $+I_2$, $+I_1$, $-I_1$, $-I_2$, respectively. The current $I_1$ represents the system current value below which the gate control will be tripped. The current $I_2$ represents the system current value above which the gate control reacquires tap changing control.

The curve 114 shows a constant frequency system current with the amplitude decreasing during approximately the first four periods and increasing during approximately the last three periods. It should be remembered that the signal voltage applied to the tripper 74 is a full wave rectified DC pulsating voltage proportional to the system current. Therefore, the signal voltage has a wave form similar to the curve 114 with the lower half-cycles inverted, as shown by the curve 128. When the absolute value of the system current decreases below the current $I_2$ for one-half cycle, as it does during the time interval $T_1$, the tripper 74 does not prevent the gate control 50 from making tap changes. When the absolute value of the system current drops below the current $I_1$ for substantially one-half cycle, as it does during the time interval $T_2$, the voltage developed at the terminal 107 of the comparator 102 is sufficient to activate the comparator 102 and prevent gate controlled tap changing. The system current must then increase to an absolute value $I_2$ as it does at the point 130 before the tripper 74 releases the gate control 50, so that it can provide tap changes.

What is claimed is:

1. Solid state tap changing apparatus comprising solid state switching means, gate control means which controls said switching means, system current sensing means, gate control tripping means having input and output terminals, the output terminals of said tripping means being connected to said gate control means, said tripping means preventing said gate control means from making a tap change when the amplitude of the system current is below a first predetermined value for substantially one-half cycle of the system current.

2. The solid state tap changing apparatus of claim 1 wherein the tripping means does not permit the gate control means to reacquire tap changing control, after it has been prevented from making tap changes, until the amplitude of the system current increases to a second predetermined value.

3. The solid state tap changing apparatus of claim 1 wherein a full wave rectified voltage, which is proportional to the system current, is applied to the input terminals of the tripping means, and two of the output terminals of the tripping means provide a voltage which changes polarity when the first predetermined value of system current amplitude is sensed.

4. Solid state tap changing apparatus comprising solid state switching means, gate control means which controls said switching means, system current sensing means, gate control tripping means having input and output terminals, the output terminals of said tripping means being connected to said gate control means, said tripping means preventing said gate control means from making a tap change when the amplitude of the system current is below a first predetermined value for substantially one-half of the system current, said tripping means preventing the gate control means from reacquiring tap changing control until the amplitude of the system current increases to a second predetermined value, said tripping means comprising a solid state transistor element, a capacitor and a resistor serially connected across a source of DC potential, said transistor being controlled by a voltage proportional to the system current, said transistor causing the charge on said capacitor to decrease when the system current maintains an amplitude above said first predetermined value during substantially one-half cycle of the system current, comparator means having an output terminal and first and second input terminals, said first input terminal being connected to said capacitor, and said second input terminal being connected in such a manner as to receive a voltage having the same polarity as the voltage at said output terminal of said comparator means.

* * * * *